US008230402B2

(12) United States Patent
Chen et al.

(10) Patent No.: US 8,230,402 B2
(45) Date of Patent: Jul. 24, 2012

(54) TESTING AND DEBUGGING OF DYNAMIC BINARY TRANSLATION

(75) Inventors: William Y. Chen, Los Altos, CA (US); Jiwei Lu, Pleasanton, CA (US); Geetha K. Vallabhaneni, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1332 days.

(21) Appl. No.: 11/865,024

(22) Filed: Sep. 30, 2007

(65) Prior Publication Data

US 2009/0089758 A1    Apr. 2, 2009

(51) Int. Cl.
    *G06F 9/45*    (2006.01)
(52) U.S. Cl. ......... 717/136; 717/140; 717/146; 717/148
(58) Field of Classification Search .................. 717/136, 717/140, 146, 148
    See application file for complete search history.

(56) References Cited

U.S. PATENT DOCUMENTS

| | | | | |
|---|---|---|---|---|
| 6,031,992 A * | 2/2000 | Cmelik et al. | ................. | 717/138 |
| 6,467,082 B1 * | 10/2002 | D'Arcy et al. | ................. | 717/136 |
| 7,058,932 B1 * | 6/2006 | Jennings et al. | ................ | 717/138 |
| 7,171,653 B2 * | 1/2007 | Albrecht | ........................ | 717/124 |
| 2004/0133884 A1 * | 7/2004 | Zemach et al. | ................ | 717/138 |

OTHER PUBLICATIONS

Yanagisawa, et al. "Automatic Generation of a Simulation Compiler by a HW/SW Codesing System", 2004, IEEE, p. 1-7.*

* cited by examiner

*Primary Examiner* — Qamrun Nahar
(74) *Attorney, Agent, or Firm* — Brooks Kushman P.C.

(57) ABSTRACT

A method for testing and debugging of dynamic binary translation wherein a dynamic binary translator allows a target binary to be executed transparently on a host machine having a different computer architecture than the target machine involves selecting a minimum set of target machine states for simulation at run-time. A series of target machine instructions from the target binary is translated into a series of host machine instructions. During translation, a plurality of check points are inserted into the series of host machine instructions. During translation, a plurality of verification points are inserted into the series of host machine instructions. The series of host machine instructions, including the check points and verification points, are executed. Execution of a check point determines a simulated target machine state. Execution of a verification point sends information pertaining to simulated target machine states to an external verifier.

16 Claims, 5 Drawing Sheets

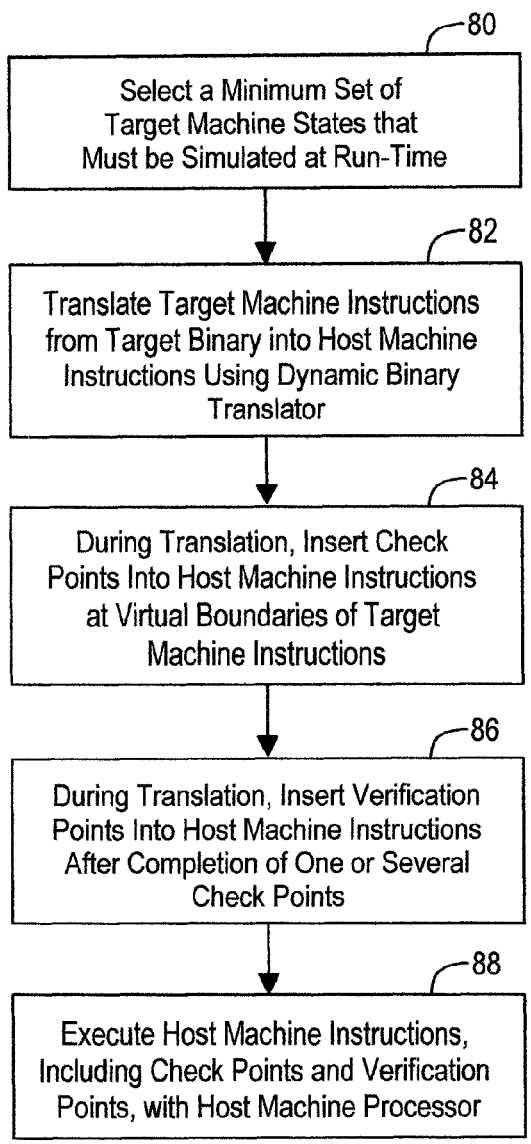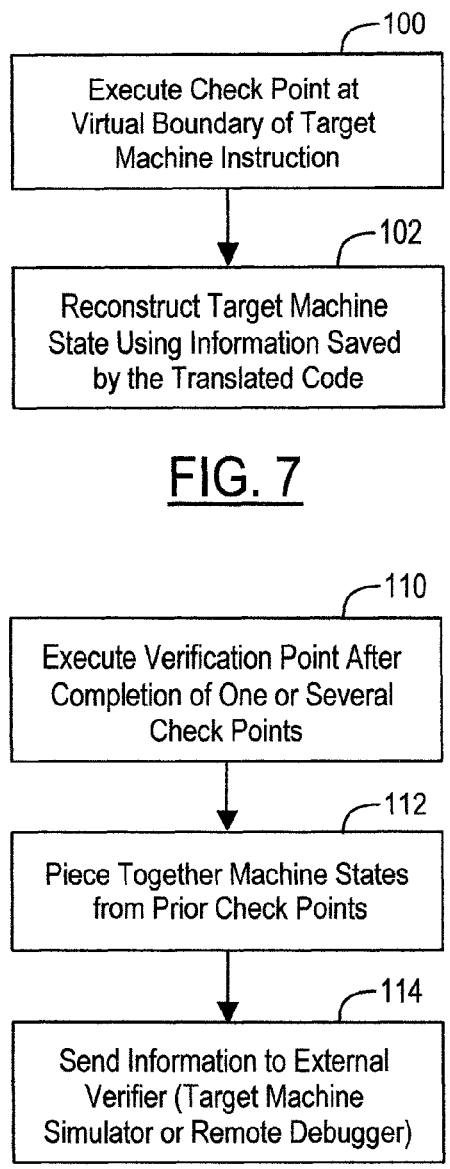

TESTING AND DEBUGGING OF DYNAMIC BINARY TRANSLATION

BACKGROUND OF THE INVENTION

1. Field of the Invention

The invention relates to a dynamic binary translator or virtual processor with which target binaries may be executed transparently on a host machine of a different computer architecture. The invention further relates to testing and debugging of dynamic binary translation.

2. Background Art

A dynamic binary translator is a virtual processor, implemented in software, that allows a target binary or executable file to be executed transparently on a host machine having a different computer architecture. In more detail, at run-time, the binary translator translates non-native code in the target binary into native code recognized by the host machine to produce the same program behavior as is generated when the target binary is executed on the target platform.

Dynamic binary translation allows the same software binaries to be executed on host machines having different computer architectures. For example, a binary for SPARC architecture may execute natively on a SPARC processor, and dynamic binary translation may be used to execute this same binary on a processor having a different architecture.

FIG. 1 illustrates a target binary 10 being executed by a target platform processor 12. That is, target binary 10 was compiled for execution on the target platform processor 12. As shown, native code 14 from target binary 10 is executed by the target platform processor 12. FIG. 2 illustrates the same target binary 10 being translated by a dynamic binary translator 20 for execution on processor 22 which has a different architecture than the target architecture for which target binary 10 was compiled. As shown in FIG. 2, the target binary 10 provides non-native code 24 that is translated by the dynamic binary translator 20, at run-time, into native code 26 for processor 22.

When implementing a dynamic binary translator, it is necessary to perform testing and debugging to assure that a program behaves the same way when executing on the target platform as when executing on a host machine of a different architecture that uses the dynamic binary translator at run-time. A commonly-used way to check for the correctness of program behavior is to match the outputs of running the same program on both the host and target machines. Unfortunately, having a matched output does not guarantee that dynamic translation is correct. An error can still exist without affecting the program output.

For the foregoing reasons, there is a desire to develop an improved approach to testing and debugging dynamic binary translation to ensure the preciseness of the translations and to allow debugging to pinpoint the cause when program errors occur.

SUMMARY OF THE INVENTION

It is an object of the invention to provide a method for testing and debugging of dynamic binary translation.

Each binary executable is generally an instruction flow at run-time. The machine state at the boundary of each execution unit, which for most modern computers is one instruction, is fixed and is deterministic. For correct execution of the binary, the machine state at each boundary must be exactly the same as expected by the designer of the machine's instruction set.

For dynamic binary translation where the target binary is translated at run-time into instructions for a host machine having a different architecture than the target architecture for which the binary was compiled, the target instructions are translated into host machine instructions and rescheduled often times. Accordingly, the execution units and their boundaries are likely to be blurred.

In accordance with the invention, a method for testing and debugging dynamic binary translation comprehends three components.

In one aspect of the invention, a minimum set of target machine states are selected. For this set of target machine states, the dynamic translator must simulate these states at run-time. These states are used to determine the correctness of the translation.

In another aspect of the invention, check points are inserted into the translated code to collect these simulated machine states. A check point is a special piece of code that uses the information saved by the translated code to reconstruct the target machine states in the selected minimum set for run-time simulation. In a base implementation, these machine states are present in the translated code and would not need to be reconstructed.

The check points are inserted at the virtual boundary of a target instruction and can be set up either following every instruction to be translated or only a selected set of the target instructions. If the translation causes overlapping of the actions of two consecutive target instructions (for example, by code coalescence and scheduling), the method may look for the next available check point or the level of translation aggressiveness may be lowered to enforce the establishment of the check points.

In a further aspect of the invention, verification points are inserted into the translated code to communicate with an external verifier to check the correctness of execution. The verification points can be inserted after completion of one or several check points. The verification point pieces together the machine states collected by the prior check points and sends this information out to the external verifier.

The external verifier may be a target machine simulator running on the same host machine or a remote debugger running on a real target machine. In operation of the method, the verifier repeatedly receives the machine states sent from the verification points and compares these with its own data to determine if the execution of the dynamic translation up to that moment is proceeding correctly. The result is communicated back to the verification points so that a log may be written to and execution may be stopped if anything goes wrong.

There are many advantages associated with embodiments of the invention. Conventional compiler testing only compares the output result to determine correctness. A dynamic binary translator needs to produce the correct output result. In addition, the translator cannot relax the precise architecture state model of execution unless instructed to do so by the user. Testing such a system can be troublesome since different users can relax different rules for preciseness. In accordance with embodiments of the invention, by using a separate architecture simulator that has already been utilized for hardware verification as a verifier, the machine states during execution can be stamped as the same as that of the underlying hardware processor. The advantage of the simulator is that all architecture states can be exported at anytime. By establishing the check points and the verification points and by selecting the proper condition of comparison with the translator, proper testing and debugging can be performed.

BRIEF DESCRIPTION OF THE DRAWINGS

FIG. 6 further illustrates the exemplary implementation of the method for testing and debugging dynamic binary translation;

FIG. 7 further illustrates actions at a check point in the exemplary implementation; and FIG. 8 further illustrates actions at a verification point in the exemplary implementation.

DETAILED DESCRIPTION OF THE PREFERRED EMBODIMENT

Figure 1:
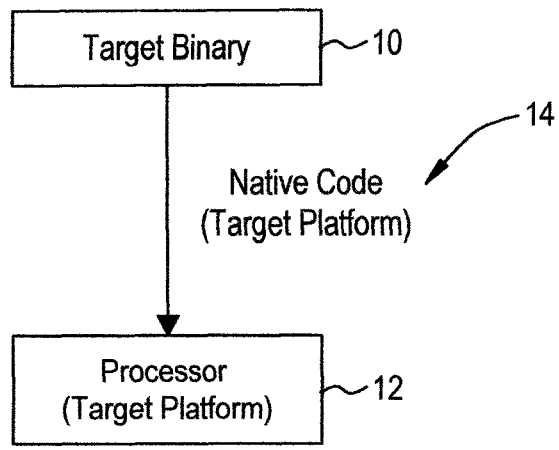
FIG. 1 illustrates a target binary being executed by a target platform processor.
Figure 2:
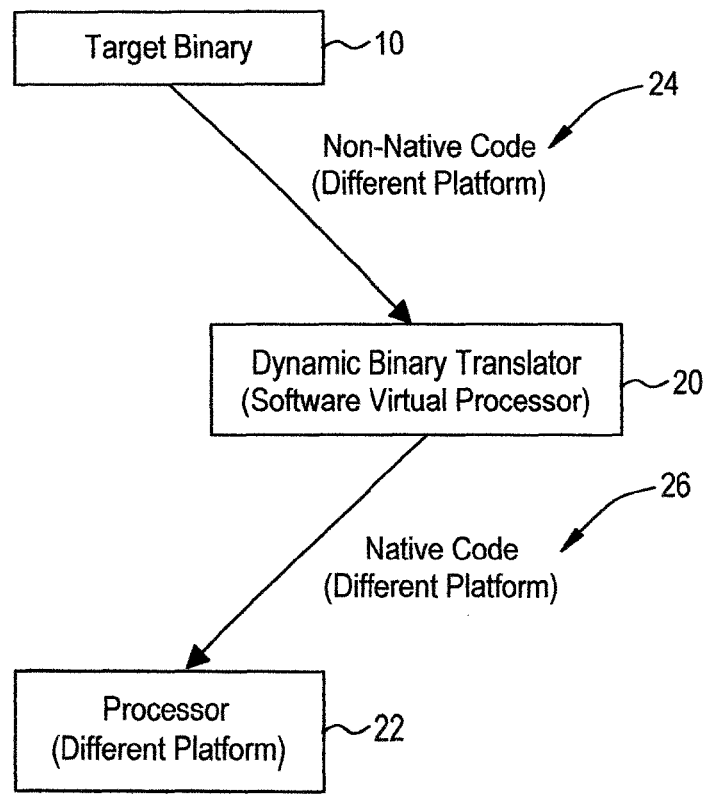
FIG. 2 illustrates the target binary being dynamically translated for execution by a processor which has a different architecture than the target architecture.
Figure 3:
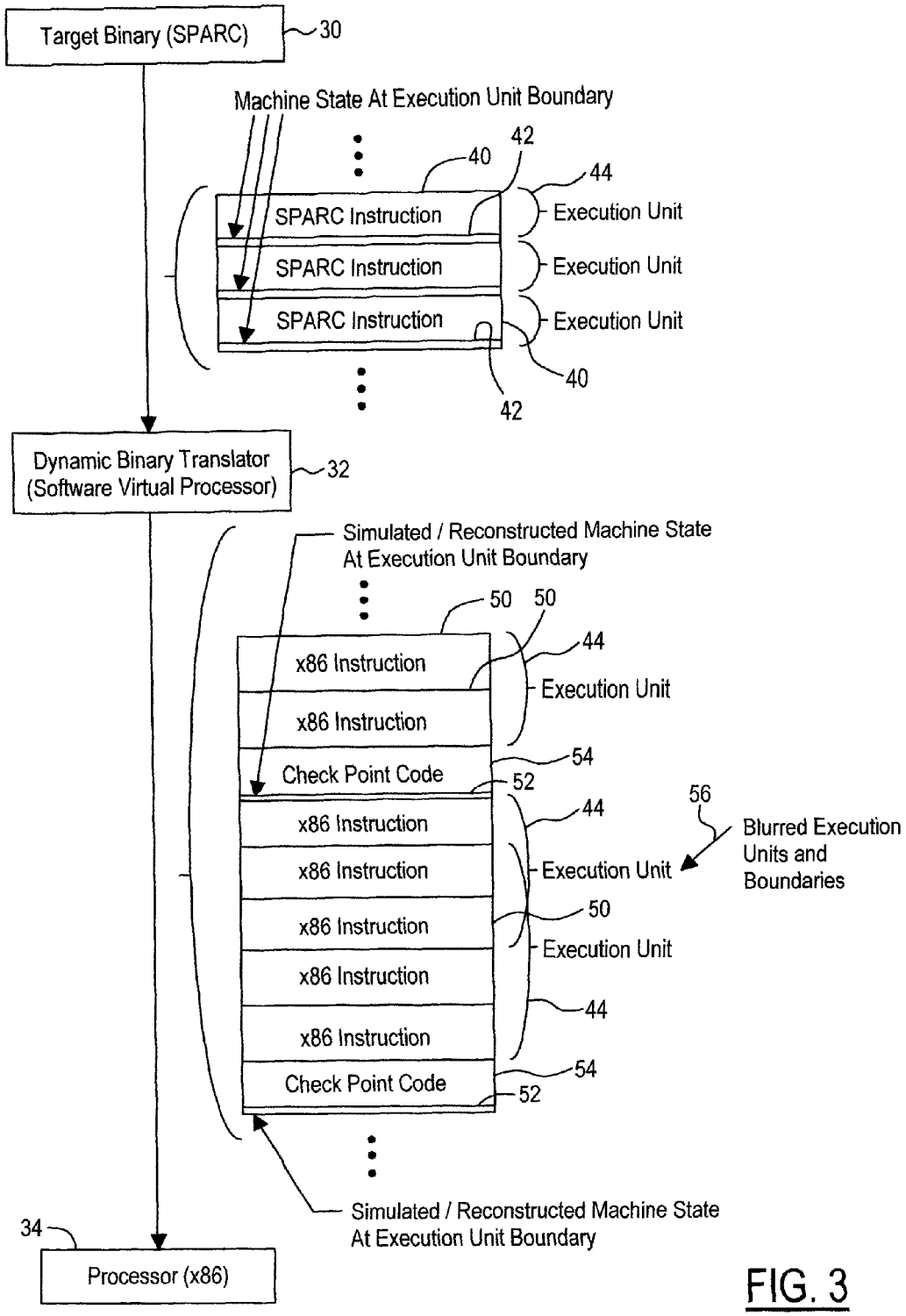
FIG. 3 illustrates a SPARC target binary being dynamically translated for execution by an x86 processor, wherein check points are inserted at the virtual boundary of some target instructions, in accordance with an exemplary implementation of the invention.

FIGS. 3-8 illustrate an exemplary implementation of the invention. In FIG. 3, a target binary 30 has been compiled for the SPARC architecture. A dynamic binary translator 32, at run-time, translates instructions in the target binary 30 into instructions for the host machine processor 34, which is illustrated as an x86 processor. The target binary or executable file 30 is generally an instruction flow at run-time, which includes SPARC instructions 40. As illustrated, each instruction 40 forms an execution unit 44 (for the target SPARC processor). The machine state (for the target SPARC processor) at the boundary 42 of each execution unit 44 is fixed and deterministic, when the target instructions 40 are executed on the target platform. That is, for correct execution of target binary 30, the machine state at each boundary 42 must be the same as expected by the designer of the machine's instruction set.

At run-time, the target binary 30 is translated by dynamic binary translator 32 into instructions for the host machine processor 34. In more detail, dynamic binary translator 32 produces a series of x86 instructions 50. Translation may involve rescheduling of instructions such that the execution units 44 and their boundaries become blurred. An example of blurred execution units and boundaries is indicated at 56.

As mentioned, the target machine states at the execution unit boundaries are fixed and deterministic. A minimum set of target machine states are selected for which the dynamic binary translator 32 must simulate these states at run-time so that these states may be used to determine the correctness of the translation. These simulated machine states are collected by check points 54. A check point 54 is a special piece of code that uses the information saved by the translated code to determine or reconstruct the target machine states at the (virtual) execution unit boundary 52.

During translation, the check points 54 are inserted at the virtual boundary 52 of a target execution unit 44 and can be set up either following every execution unit 44 to be translated or only a selected set of the execution units 44, which in this case are the target instructions. If the translation causes overlapping of the actions of two consecutive target instructions as illustrated at 56 (for example, by code coalescence and scheduling), the method may look for the next available check point 54 or the level of translation aggressiveness may be lowered to enforce the establishment of the check points 54.

Figure 4:
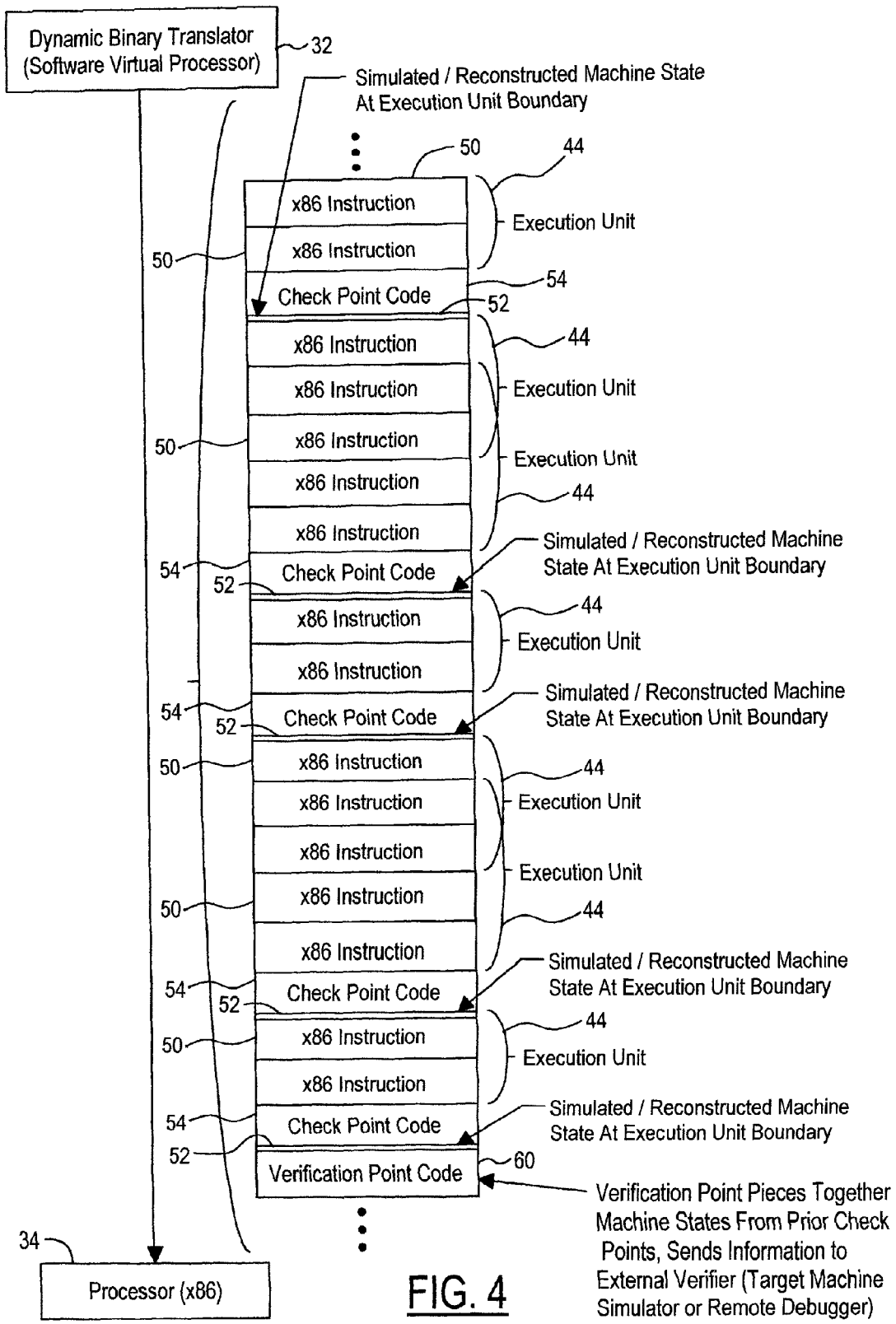
FIG. 4 further illustrates the host machine instructions, with the check points inserted at the virtual boundary of some target instructions and with a verification point inserted after several check points, in accordance with the exemplary implementation of the invention.

FIG. 4 illustrates the series of host machine instructions 50 from the dynamic binary translator 32 in more detail. As shown, dynamic binary translator 32 produces the series of x86 instructions 50. As well, some of the execution units 44 are shown rescheduled with the resulting blurred boundaries. Check points 54 are inserted at the virtual boundaries 52 of execution units 44. Verification points 60 are inserted into the translated code to communicate with an external verifier. The verification point 60 pieces together machine states from prior check points 54, and may be inserted by dynamic binary translator 32 after one or several check points 54. The verification point 60 sends the state-related information to the external verifier to check the correctness of execution.

Figure 5:
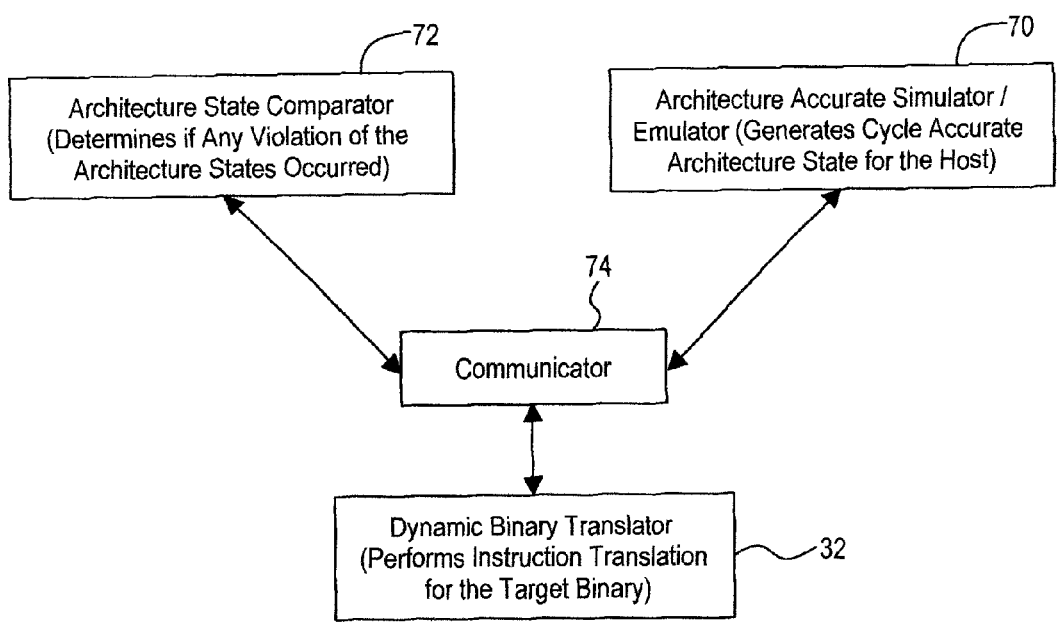
FIG. 5 illustrates the four components of the exemplary implementation of the method for testing and debugging dynamic binary translation.

FIG. 5 illustrates the four components of the exemplary, prototype, implementation. The dynamic binary translator 32 performs instruction translation for the target binary, inserts check points, and inserts verification points. Dynamic binary translator 32 is executing on the host machine. "Target" refers to the system for which the target binary was compiled and from which the binary is to be translated. To implement the verification, further illustrated in FIG. 5 are an architecture accurate simulator/emulator 70, an architecture state comparator 72, and a communicator 74.

In more detail, the architecture accurate simulator/emulator 70 is used to generate cycle accurate architecture state for the host machine. The dynamic binary translator 32 is the target execution library which performs the instruction translation for the target binary. The state comparator 72 takes the architecture states from both the architecture accurate simulator/emulator 70 and the dynamic binary translator 32 (information sent by a verification point) and performs the necessary tasks to determine if any violation of the architecture states occurred. All three components are glued together by the communicator 74, which transmits architecture states and actions to be performed between the components. These four components can be threads within the same process, different processes, or any combination in between. An alternative implementation is not restricted to these four components. Some or all of the components may be combined. Each component may be further divided into subcomponents.

In general, the actions taken by the example implementation illustrated in FIG. 5 are as follows:

1. Synchronize between all the components to a single known architecture state.

2. Simulator 70 and translator 32 (via a verification point) communicate architecture states to the comparator 72.

3. Comparator 72 determines the correctness of the translated states.

4. Take action when state error is discovered.

When action is taken due to discovery of a state error, several actions are possible. One possibility is to stop execution, and print out the error and the states involved. Instead of quitting the execution, another possibility is to try to compensate for the succeeding states. Another possibility is to try to re-synchronize to a future known state.

The example implementation can also be configured to do different types of comparison. One approach is to compare all instructions translated by the translator on the target instruction boundary. Another approach is to compare on a set boundary for a group of target instructions. Another approach is to compare on a preset number of instructions, where the number can be small or large. Another example is to compare on each transfer of flow of control, such as branch instructions. The comparison can involve accurate per target instruction state. Or, the comparison can involve a unique summary of a group of target instructions.

FIGS. 6-8 further illustrate an exemplary method for testing and debugging dynamic binary translation, in accordance with the invention. This method may be implemented with the components described in FIG. 5. In FIG. 6, at block 80, a minimum set of target machine states that must be simulated are selected. That is, the selected target machine states are states of the target machine at an execution unit (which is typically a single instruction) boundary. As depicted at block 82, in operation, target machine instructions from the target binary are translated into host machine instructions using the dynamic binary translator. Blocks 84 and 86 depict, during translation, the insertion of check points into the host machine instructions at virtual boundaries of target machine instructions and the insertion of verification points into the host machine instructions after completion of one or several check points, respectively. At block 88, the host machine instructions, including the check points and verification points, are executed by the host machine processor.

FIG. 7 illustrates further details relating to the check points. In particular, block 100 describes the execution of a check point at a virtual boundary of a target machine instruction. Block 102 describes the reconstruction (or determination) of target machine state using information saved by the translated code.

FIG. 8 illustrates further details relating to the verification points. In particular, block 110 describes the execution of a verification point after completion of one or several check points. According to block 112, machine states from prior check points are pieced together. And, at block 114, the information relating to the states is sent to the external verifier.

It is appreciated that embodiments of the invention are not limited to any particular target machine or host machine architecture. In general, the invention comprehends the insertion of check and verification points that gather and send state-related information to a verifier for use in testing and debugging dynamic binary translation. The examples described herein illustrate a particular implementation and other implementations are possible.

Further, it is to be appreciated that a dynamic binary translator translates the instructions from a target architecture to a host architecture. The target architecture can be any architecture, including a different architecture than the host architecture, the same architecture as the host architecture with the same implementation, or the same architecture as the host architecture with a different implementation (for example, different extensions).

When the host machine and target machine are the same architecture, dynamic binary translation can be used, for example, to optimize for more performance, use features not available, translate instructions not implemented, or correct a bug in the implementation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for testing and debugging of dynamic binary translation wherein a dynamic binary translator allows a target binary to be executed transparently on a host machine having a different computer architecture than a target machine, and wherein, at run-time, the dynamic binary translator translates the target binary to produce a same program behavior on the host machine as when the target binary is executed on the target machine, the method comprising:

selecting a minimum set of target machine states for simulation at run-time;

translating a series of target machine instructions from the target binary into a series of host machine instructions;

during translation, inserting a plurality of check points into the series of host machine instructions, each check point being configured to determine a simulated target machine state using information saved by the translated target binary, wherein inserting the plurality of check points further comprises attempting to insert a check point in the series of host machine instructions at a virtual boundary of a target machine instruction, and in the event that the virtual boundary is blurred due to overlapping of the host machine instructions for at least two target machine instructions, omitting the insertion of the check point at the blurred virtual boundary;

during translation, inserting a plurality of verification points into the series of host machine instructions;

executing the series of host machine instructions, including the check points and verification points;

wherein the execution of a check point determines a simulated target machine state using information saved by the translated target binary; and wherein the execution of a verification point sends information pertaining to simulated target machine states to an external verifier.

2. The method of claim 1 wherein the execution of a check point reconstructs a simulated target machine state.

3. The method of claim 1 wherein inserting the plurality of check points further comprises:

inserting a check point in the series of host machine instructions at a virtual boundary of a target machine instruction.

4. The method of claim 1 wherein inserting the plurality of check points further comprises:

inserting a check point in the series of host machine instructions at each virtual boundary of each target machine instruction.

5. The method of claim 1 wherein inserting the plurality of check points further comprises:

inserting a check point in the series of host machine instructions at each virtual boundary of each target machine instruction in a selected set of target machine instructions.

6. The method of claim 1 wherein inserting the plurality of check points further comprises:

attempting to insert a check point in the series of host machine instructions at a virtual boundary of a target machine instruction; and in the event that the virtual boundary is blurred due to overlapping of the host machine instructions for at least two target machine instructions, reducing an aggressiveness of the dynamic binary translation.

7. The method of claim 1 wherein inserting the plurality of verification points further comprises:

inserting a verification point after the insertion of a plurality of check points.

8. The method of claim 1 wherein the external verifier is a target machine simulator running on the host machine.

9. The method of claim 1 wherein the external verifier is a remote debugger running on a real target machine.

10. A system for testing and debugging of dynamic binary translation, the system comprising a non-transitory medium storing instructions for:
    a dynamic binary translator for translating a target binary to allow the target binary to be executed transparently on a host machine having a different computer architecture than a target machine;
    an architecture accurate emulator for emulating target machine states;
    an architecture comparator for comparing an architecture state from the dynamic binary translator and an architecture state from the architecture accurate emulator;
    wherein the dynamic binary translator translates a series of target machine instructions from the target binary into a series of host machine instructions, inserts a plurality of check points into the series of host machine instructions, each check point being configured to determine a simulated target machine state using information saved by the translated target binary, and inserts a plurality of verification points into the series of host machine instructions, and wherein the dynamic binary translator is configured to attempt to insert a check point in the series of host machine instructions at a virtual boundary of a target machine instruction, and in the event that the virtual boundary is blurred due to overlapping of the host machine instructions for at least two target machine instructions, the insertion of the check point at the blurred virtual boundary is omitted;
    wherein execution of a check point determines a simulated target machine state using information saved by the translated target binary; and
    wherein execution of a verification point sends information pertaining to simulated target machine states to the architecture comparator.

11. The system of claim 10 wherein the execution of a check point reconstructs a simulated target machine state.

12. The system of claim 10 wherein the dynamic binary translator is configured to insert a check point in the series of host machine instructions at a virtual boundary of a target machine instruction.

13. The system of claim 10 wherein the dynamic binary translator is configured to insert a check point in the series of host machine instructions at each virtual boundary of each target machine instruction.

14. The system of claim 10 wherein the dynamic binary translator is configured to insert a check point in the series of host machine instructions at each virtual boundary of each target machine instruction in a selected set of target machine instructions.

15. The system of claim 10 wherein the dynamic binary translator is configured to attempt to insert a check point in the series of host machine instructions at a virtual boundary of a target machine instruction; and
    in the event that the virtual boundary is blurred due to overlapping of the host machine instructions for at least two target machine instructions, an aggressiveness of the dynamic binary translation is reduced.

16. The system of claim 10 wherein the dynamic binary translator is configured to insert a verification point after the insertion of a plurality of check points.

* * * * *